United States Patent [19]

Pallari

[11] 4,043,366
[45] Aug. 23, 1977

[54] CLEARING MACHINE FOR BRUSHWOOD
[76] Inventor: Kyosti Pallari, 95385 Tervola, Finland
[21] Appl. No.: 678,988
[22] Filed: Apr. 21, 1976

Related U.S. Application Data
[63] Continuation-in-part of Ser. No. 531,044, Dec. 9, 1974, Pat. No. 3,996,980.
[51] Int. Cl.² .............................................. A01G 23/08
[52] U.S. Cl. .................................. 144/34 E; 30/240; 56/255; 83/675; 144/218
[58] Field of Search .................................. 56/500–504, 56/192, 255, 138, 139; 144/34 R, 34 E, 34 A, 218; 83/675, 676, 666; 30/240, 264, 263, 379

[56] References Cited
U.S. PATENT DOCUMENTS
1,012,892  12/1911  Moody .................................. 56/255
1,715,675  6/1929  Rader .................................. 30/240 X
1,950,472  3/1934  Bowers .............................. 30/240 X Primary Examiner—Othell M. Simpson
Assistant Examiner—W. D. Bray
Attorney, Agent, or Firm—Howson and Howson

[57] ABSTRACT

Shearing means of a brushwood cutter has a rotor with a plurality of sickle-shaped cutters, and a plurality of stationary, triangular tooth-like edge protrusions of a plate on which the rotor rotates. The curve defined by the cutting edge of each of the sickle-shaped cutters is such that the tangent at any tangent point of the curve is disposed at between 50°–80°, and preferably between about 60°–80°, with respect of a radial line passing through such tangent point and through the center of rotation of the rotor to secure a smooth operation of the rotor and to render the device capable of cutting relatively large pieces of brushwood.

2 Claims, 3 Drawing Figures

CLEARING MACHINE FOR BRUSHWOOD

This is a continuation-in-part application of my prior application, "CLEARING MACHINE FOR BRUSHWOOD" bearing Ser. No. 531,044, filed Dec. 9, 1974, now U.S. Pat. No. 3,996,980.

BACKGROUND OF THE INVENTION

This invention relates to a clearing machine for brushwood of the type having a stationary blade portion with projecting cutters and a rotary blade plate cooperating with the former, wherein the rotary blade plate comprises sickle-shaped cutters cooperating with the projecting cutters of the stationary blade portion.

Machines of the above-mentioned type are known to have been used as lawn mowers or as bush cutters. The known machines are not suitable for cutting and clearing of heavier brushwood the base diamater of which may be up to 15 cm, due to the size of the machines and particularly due to the mutual working principle of the blades of such cutters.

Attention has recently been paid to the possibilities of using fast growing brushwood as raw material for board producing industry or for pulp and paper industry. One of the problems associated with the use of brushwood has been the lack of a suitable brushwood clearing machine.

An object of this invention is to solve the above problem and to provide a suitable machine for effective mechanical clearing of brushwood.

SUMMARY OF THE INVENTION

In broad terms, the present invention provides a machine for clearing brushwood or the like comprising a frame, at least one pair of cutting units mounted on the frame, each of said cutting units comprising a stationary blade member having a plurality of circumferentially spaced cutter elements of generally triangular configuration and a rotary blade member cooperating with the cutter elements of the stationary blade member, means for rotating said rotary blade members in opposite directions and in a direction to advance materials cut rearwardly, a chopper unit for reducing the brushwood or the like to a chip form, the machine further including feeding means for advancing the cut brushwood or the like to the chopper unit, said feeding means including a plurality of feeding reels which are mounted to rotate with the rotary blade elements in opposite direction toward the chopper unit.

According to the present invention, shearing means is provided for a machine for clearing brushwood or the like. The shearing means comprises a pair of cooperating stationary blade members and a rotor comprising rotary blade members. The stationary blade members have a plurality of circumferentially disposed cutter elements of generally triangular configuration and the rotor blade member has a plurality of circumferentially spaced sickle-shaped cutter elements cooperating with the cutter elements of the stationary blade member. The sickle-shaped cutting elements project in a circumferential direction in such a manner that they form with the stationary blade elements enclosed areas restricted by the cutters, which areas progressively decrease in size as the rotary and stationary blade members rotate relative to each other. In other words, the cutting point of each of the sickle-shaped elements moves from points adjacent the tip of the stationary cutter elements towards their basis. The shearing means further comprises pushing means engageable with the brushwood or the like forwardly of the blades and disposed at a predetermined height above the blades. Each of the sickle-shaped cutter elements defines a concavely curved cutting edge having a free end and a root end extending in a generally radially-circumferential direction along a curve, the angle between a tangent touching such curve at any point thereof and a radial line between said point and the center of rotation of the rotor being 50° to 80°, preferably 60° to 80°.

BRIEF DESCRIPTION OF THE FIGURES

The invention will now be described in greater detail with reference to an embodiment shown in the accompanying drawings, in which.

DESCRIPTION OF A SPECIFIC EMBODIMENT

Figure 1:
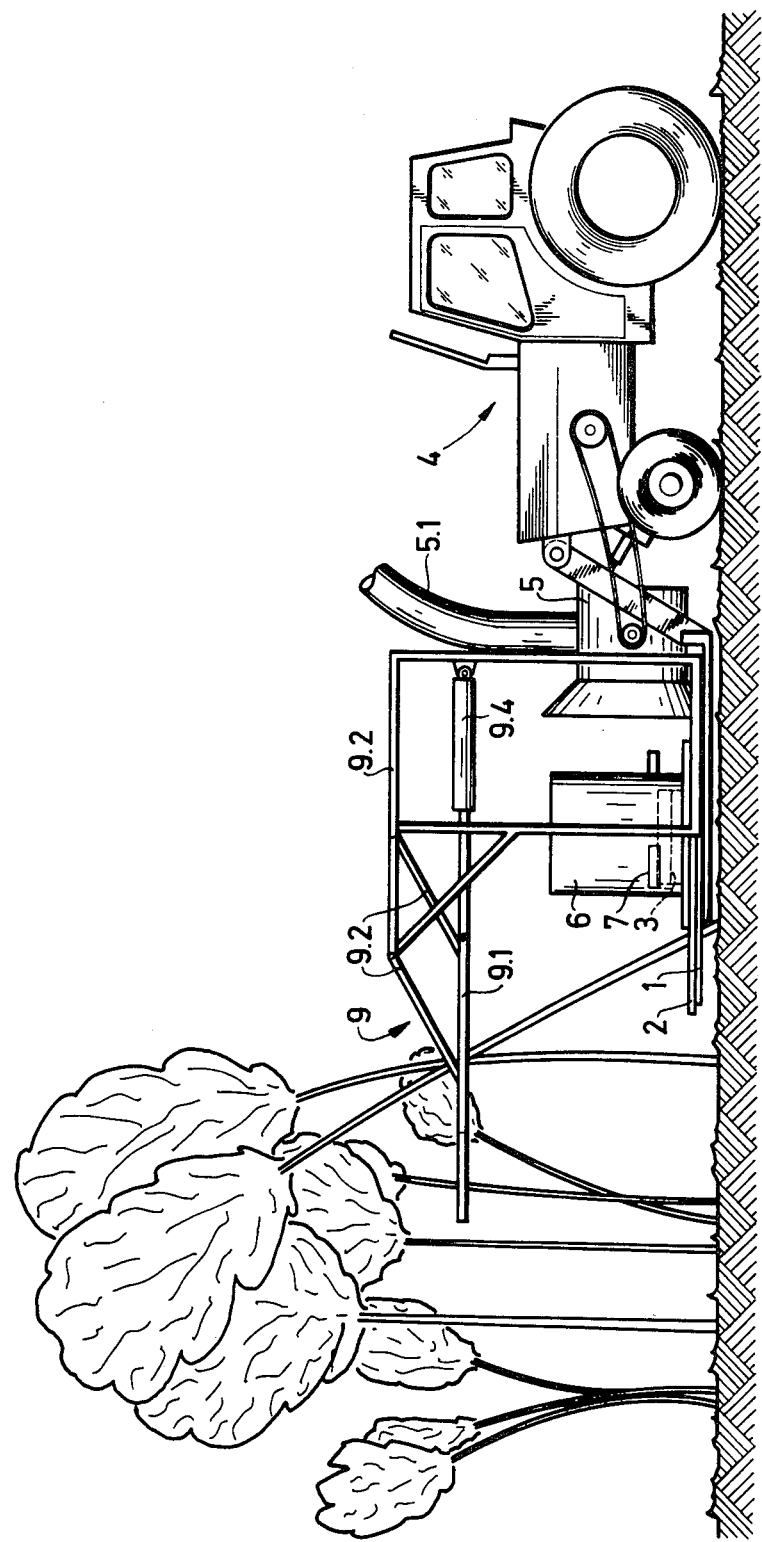
FIG. 1 is a side view of the machine according to the invention.
Figure 2:
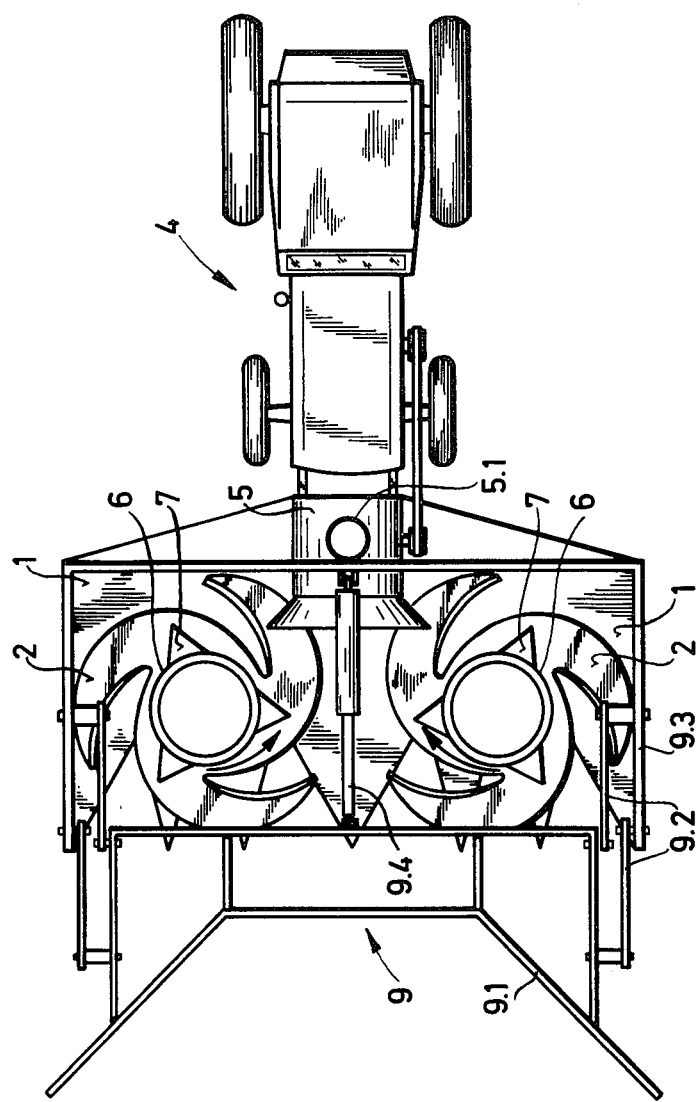
FIG. 2 is a plan view of the same.
Figure 3:
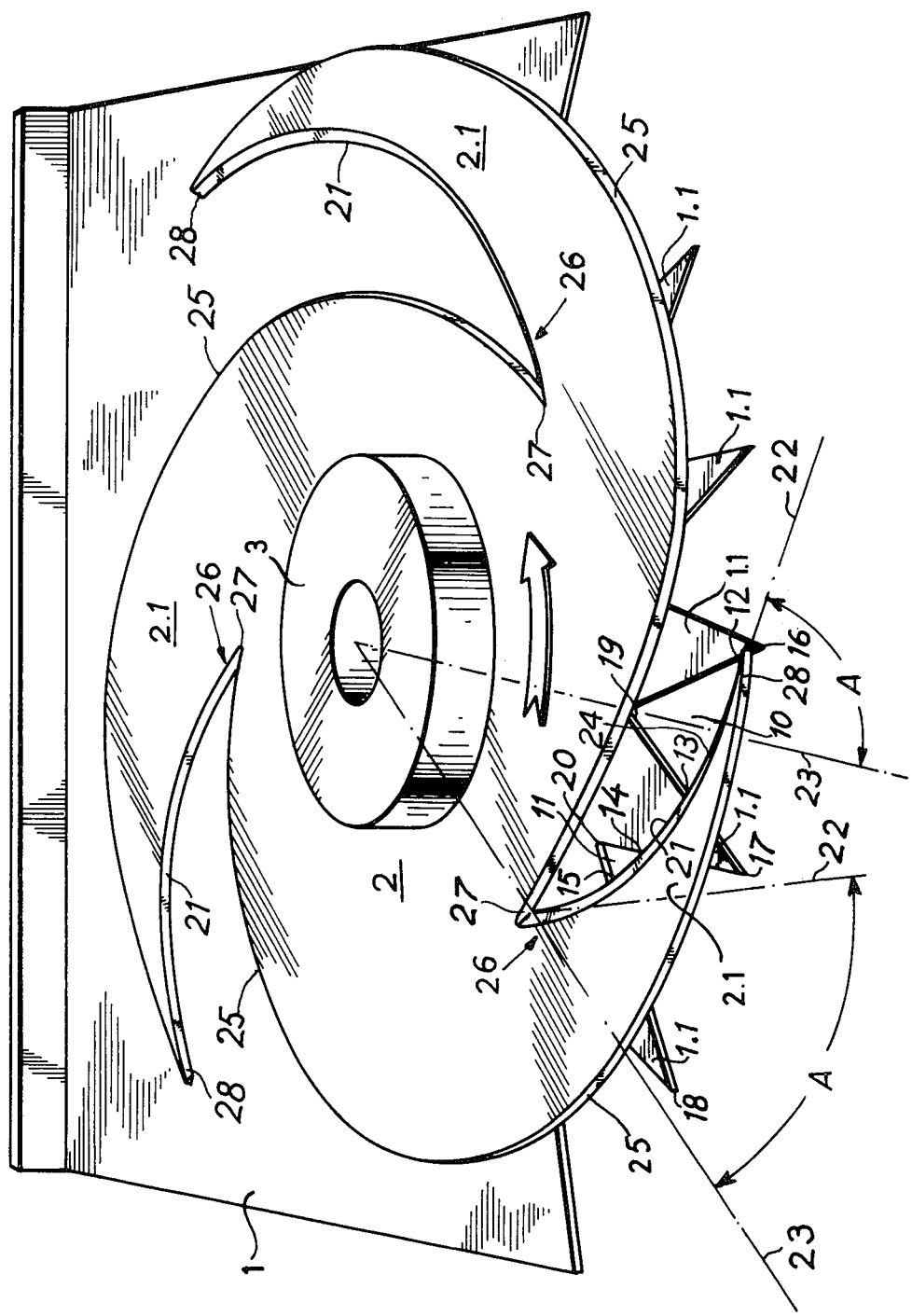
FIG. 3 shows the design of the blade portions of the machine in a greater detail.

The shown clearing machine for brushwood is secured to a mobile working machine of the type of a tractor 4, forwardly thereof. The device comprises a stationary plate 1 from the front edge of which project cutters 1.1. A rotary blade plate 2, also referred to as the rotor 2, is secured for pivotal movement on the stationary plate 1 in a generally horizontal plane. The rotor 2 comprises peripheral sickle-shaped cutters 2.1 extending in radial-peripheral direction with respect to the axis of rotation of the rotor 2. The cutters 2.1 are designed such that they form, together with the cutters 1.1, areas or openings which are completely surrounded by the cutters and which get progressively reduced in size as the blade plate 2 rotates in the direction of arrows shown in FIGS. 2 and 3. The rotation of blade plate 2 is effected by a hydraulic motor 3 (FIG. 1). As shown in FIG. 2, the apparatus comprises two rotary blades 2, one of such blades, forming shearing means with the stationary plate 1, being shown in greater detail in FIG. 3. Referring therefore to FIG. 3, it will be seen that shearing means is shown for a machine for clearing brushwood and having cooperating stationary blade members 1.1 and a rotor driven by a hydraulic motor 3. The stationary cutter elements 1.1 are disposed circumferentially and are of generally triangular configuration, while the rotary blade plate 2 comprises three circumferentially spaced, sickle-shaped cutter elements 2.1 cooperating with the cutter elements 1.1 of the stationary plate or blade member 1. As shown in FIG. 3, the sickle-shaped cutting elements 2.1 project in a circumferential direction in such a manner that they form with the stationary blade elements 1.1 enclosed areas 10, 11 which are each restricted by the cutters 1.1 and 2.1. It will be apparent that the areas 10, 11 progressively decrease in size as the rotary and stationary blade members 1, 2 are rotated relative to one another. It will be apparent that at mutual position as shown in FIG. 3, the cutter 21 facing the viewer of FIG. 3, defines a plurality of cutting points 12, 13, 14 and 15, the cutting points 12–15 being points at which the edge of the cutter 2.1 contacts the respective edges of cutters 1.1 defining the enclosed areas 10, 11. It will be apparent that the cutting points 12 through 15 move each from a location adjacent to tips 16, 17, 18 of the stationary cutter elements 1.1 towards their bases 19, 20. It will be seen that, for instance, the cutting point 12 is relatively remote from its associated base 19, while the cutting point 15 is relatively close to the base 20 as the enclosed area 11 is substantially reduced in size as compared with the area 10.

Each of the sickle-shaped cutter elements 2.1 defines a concavely curved cutting edge 21 which extends in a generally radially-circumferential direction along a curve which is concave with respect to the center of rotation of the rotor 2. The angle A between a tangent 22 touching the curve of the cutting edge 21 at any point thereof (two tangents shown in FIG. 3) and a radial line 23 passing through said point 24 and through the center of rotation of the rotor 2 is 50°. It is to be understood, that the preferred size of the angle A is 60° to 80°, to assure smooth action of the cutting edge 21 during the rotation of the rotor, without undesired flashing of brushwood which would inevitably occur if the angle were less than 50°.

It will be appreciated that the cutting edge 21 of each of the sickle-shaped elements 2.1 is a leading edge of the respective cutter 2.1. Each cutter 2.1 also has a trailing edge 25. The trailing edge of each of the cutters 2.1 is convexly curved to merge with root end 26 of the adjacent trailing cutter elements 2.1. The joinder 27 between the trailing edge 25 and between its associated cutting edge of the next cutter 2.1 is a point at which the cutting edge 26 and the trailing edge 25 meet at an acute angle.

The overall length of the cutting edge 21 of each of the sickle-shaped cutters 2.1 is sufficient to span one entire void or space between two adjacent stationary cutters 1.1 and at least a portion of a second void located forwardly of the tip of the sickle-shaped cutter 2.1 with respect to the rotation of the rotor 2. Thus, the areas 10, 11 can also be referred to as a first void 11 and a second void 10. It will be observed that the above relationship between the overall length of the cutting edge 21 and the voids 11, 10 is present in the embodiment of FIG. 3. In other words, on closing of the second void 10 by the leading end 28 of the cutter edge 21 of the sickle-shaped cutter 2.1, the trailing end (coincident with the root end 26) is still radially spaced from an inside end of the first void 11. Thus, the first void and the second void together with the cutter edge 21 of the foremost sickle-shaped cutter 2.1 in FIG. 2 define two enclosed, generally triangular openings corresponding in shape to the above referred enclosed areas or voids 10, 11.

The above described mutual arrangement and motion of the cutters 2.1 relative to cutters 1.1 ensures that the brushwood to be cut does not give way in front of the cutters but as the cutting points moved toward the basis of the cutters, the brushwood material tending to give way is also properly cut due to the gradual restriction of the enclosed area, 10, 11. The above-noted arrangement is furthermore important as it facilitates the cutting of relatively thick small timber. As the cutter 2.1 extends substantially in the direction of the periphery, the cutting effect produced by same is similar to a slicing effect over a relatively large angle of rotation of the rotor 2. This effectively avoids the squeezing of workpiece between two cutters which would result in a rugged operation of the rotor. Moreover, the squeezing would result in failure to cut relatively large trees (e.g., those over 5 cm in diameter). The rotational velocity and mass of the blade plates 2 can be selected to suit cutting of relatively large trees. Preliminary tests of the present invention have shown that it is possible to cut down trees having the base diameter up to 10 or 15 cm.

In operation, the cut timber falls upon the rotating blade 2 from where it is fed to the rear end of the plate 1. In the embodiment shown in FIGS. 1 and 2, two cutting units are arranged side by side revolving each in a direction opposite to the direction of rotation of the other unit. Consequently, the cut timber is brought between the two rotors and fed towards a chopper 5 through the space between the rotors 2. The feeding to the chopper 5 is facilitated by means of feed reels 6 placed on the rotors 2 to rotate in common with same. The feeding reel 6 is provided, on periphery thereof, with triangular plates 7 which assist in feeding the timber to the chopper 5. The chips produced by chopper 5 are then removed in a known way and deposited, e.g., to a loading bed which is arranged immediately beside the machine (the loading bed now shown in the drawings), by means of a blower and pipe 5.1. Obviously, the loading bed can be secured to the rear end of the tractor 4 but it is preferred that it be entirely separate from the same.

A further feature of the present invention is in the provision of pushing means 9 extending forwardly obliquely above the blades and used (FIG. 1) in bending the timber forwardly away of tractor 4 thus securing that the cut timber is fed to the chopper 5 with their bases first. The pushing means 9 includes a pushing fork 9.1 which is suspended from a stationary body portion 9.3 of the pushing means, by means of link arms 9.2. Thus, the assembly of the pushing means makes it possible to selectively adjust the height and overall position of the pushing fork 9.1, by use of a hydraulic piston-cylinder apparatus 9.4.

Those skilled in the art will appreciate that different modifications of the embodiment as described above are possible, without departing from the scope of the present invention. For instance, the overall arrangement of the shearing means on a cutting machine can differ from that shown in FIGS. 1 and 2. The mobile unit of tractor 4 as shown in the above embodiment can, of course, be changed to a different type. The cutting unit may extend to one side of the mobile machine to render same suitable for cutting down roadside brushwood. The rotation of rotor or rotors 2 can be effected by means of a chain drive, belt drive or the like. These and other modifications, however, do not depart from the scope of the present invention as set forth in the accompanying claims.

I claim:

1. Shearing means for a machine for clearing brushwood or the like comprising a stationary plate member and a rotor having rotary blade members, said stationary plate member having a plurality of circumferentially disposed cutter elements of generally triangular configuration and said rotary blade member having a plurality of circumferentially spaced sickle-shaped cutter elements cooperating with the cutter elements of the stationary plate member having a cutting edge, said sickle-shaped cutter elements having a leading edge coincident with said cutting edge and a trailing edge, said trailing edge being convexly curved to merge with the root end of the adjacent trailing cutter element, the joinder between said trailing edge and said cutting edge of the adjacent trailing sickle-shaped cutting element being a point at which said cutting edge and said trailing edge meet at an acute angle, said sickle-shaped cutting elements projecting in a circumferential direction in such a manner that they form with the generally triangular cutter elements enclosed areas, being arranged to progressively decrease in size as the sickle-shaped elements are rotated relative to the stationary plate with cutting points, defined by instantaneous points of contact between cutting edges of said sickle-shaped elements and the associated edges of the stationary plate members, moving from a location adjacent the tips of the stationary cutter elements toward their bases, each of said sickle-shaped cutter elements defining a concavely curved cutting edge extending in a generally radially-circumferential direction along a curve which is concave with respect to the center of rotation of said rotor, the angle between a tangent touching said curve at any tangent point thereof, and a radial line passing through the center of rotation of said rotor being 50° to 80°.

2. Shearing means for a machine for clearing brushwood or the like comprising a stationary plate member and a rotor having rotary blade members, said stationary plate member having a plurality of circumferentially disposed cutter elements of generally triangular configuration and said rotary blade member having a plurality of circumferentially spaced sickle-shaped cutter elements cooperating with the cutter elements of the stationary plate member having a cutting edge, said sickle-shaped cutting elements projecting in a circumferential direction in such a manner that they form with the generally triangular cutter elements enclosed areas, the circumferentially disposed stationary cutter elements defining at least two generally triangular intermediate voids between adjacent cutter elements, the overall length of the cutting edge of said sickle-shaped cutter elements being sufficient to simultaneously span one entire first void and at least a portion of a second void, said second void being spaced from said first void in the direction of rotation of the rotor, said cutting blade and said two voids being so arranged that on closing said second void by the leading end of the cutting edge of said sickle-shaped cutter, the trailing end of said cutting edge is still radially spaced from a radially inside end of said first void, whereby said voids and said cutting edge are capable of defining two enclosed, generally triangular openings decreasing in size as the rotor is rotated, with cutting points, defined by instantaneous points of contact between cutting edges of said sickle-shaped elements and the associated edges of the stationary plate members, moving from a location adjacent the tips of the stationary cutter elements toward their bases, each of said sickle-shaped cutter elements defining a concavely curved cutting edge extending in a generally radially-circumferential direction along a curve which is concave with respect to the center of rotation of said rotor, the angle between a tangent touching said curve at any tangent point thereof, and a radial line passing through such tangent point and through the center of rotation of said rotor being 50° to 80°.

* * * * *